Oct. 25, 1949.　　　M. P. BUEHLER　　　2,486,002
TELESCOPE SIGHT MOUNT
Filed Oct. 21, 1947

INVENTOR.
Maynard P. Buehler
BY
McMorrow, Berman & Davidson
Attorneys

Patented Oct. 25, 1949

2,486,002

UNITED STATES PATENT OFFICE 2,486,002

TELESCOPE SIGHT MOUNT

Maynard P. Buehler, Oakland, Calif.

Application October 21, 1947, Serial No. 781,089

1 Claim. (Cl. 33—50)

This invention relates to sight mounts for guns, and more particularly to a telescope sight mount.

It is an object of this invention to provide a sight mount of the kind to be more particularly described hereinafter, formed with a single base which adds more rigidity to the telescope ends so constructed and arranged to provide for the greater ease of installation of the mount on the rifle.

Another object of this invention is to provide a mount of this kind having a rear ring supported on oppositely threaded screws engaging the base whereby the rear ring may be adjusted laterally for a windage adjustment.

A further object of this invention is to provide a mount of this kind in which the front ring is rotatably supported on the base in such a manner that it may be readily removed with a quarter turn of the telescope.

A further object of this invention is to provide a telescope mount of this kind in which the telescope may be removed and re-attached to the base while maintaining a set of original adjustment.

With the above and other objects in view, my invention consists in the arrangement, combination and details of construction disclosed in the drawings and specification, and then more particularly pointed out in the appended claim.

Figure 1:
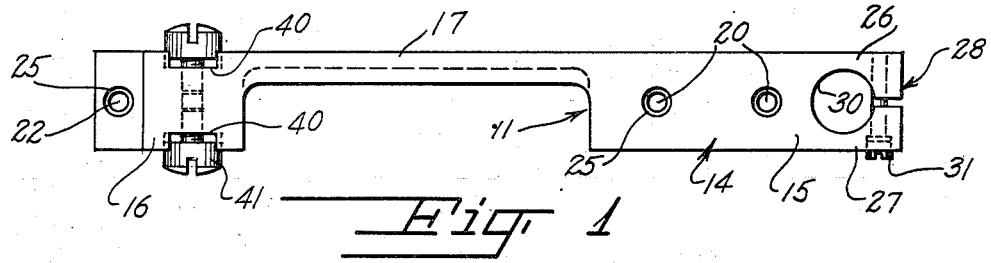
Figure 1 is a top plan view of the base of the telescope mount.
Figure 2:
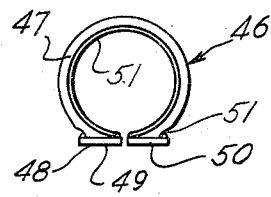
Figure 2 is a front elevation of the rear ring.
Figure 3:
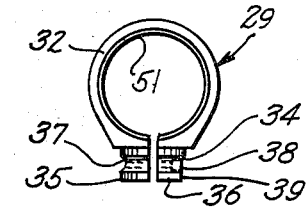
Figure 3 is a front elevation of the front ring.
Figure 4:
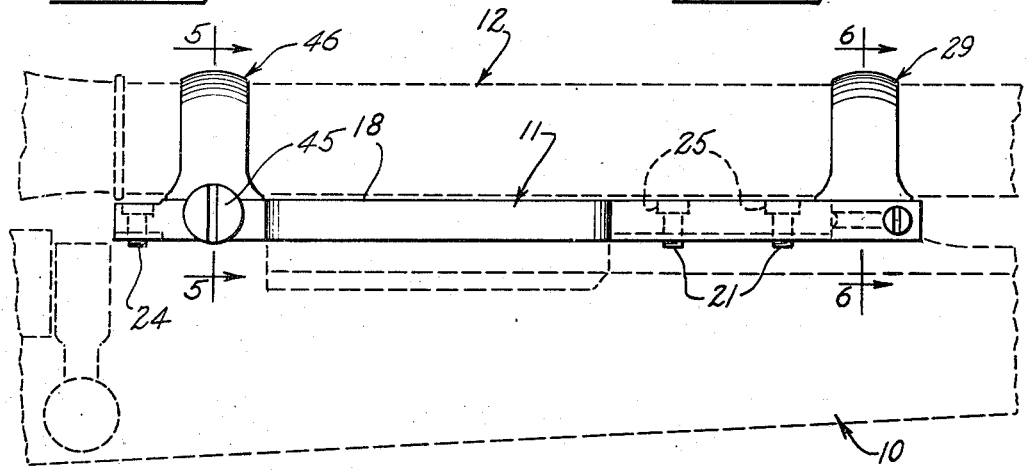
Figure 4 is a side elevation showing the mount assembled on a rifle.
Figure 5:
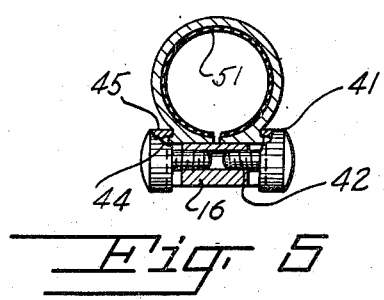
Figure 5 is a transverse section taken on the line 5—5 of Figure 4.
Figure 6:
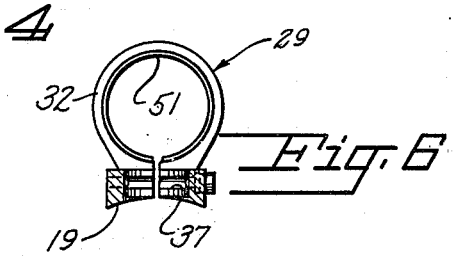
Figure 6 is a transverse section taken on the line 6—6 of Figure 4.

Referring to the drawings, the numeral 10 designates generally a rifle on which a sight mount 11 is engaged for securely attaching a telescope sight 12 to the rifle.

The mount 11 is so constructed and arranged that the telescope 12 will be supported as close to the axis of the barrel on the rifle as is possible for the convenience of the user.

The sight mount 11 is formed with a fixed base 14 having a front base section 15 and a rear base section 16 connected together by a side arm 17. The side arm 17 or connecting bar between base sections 15 and 16 is formed as an extension of the front and rear sections on one side of the base.

The entire base is formed with a flat upper surface 18 and a concave surface 19. The surface 19 is adapted for smoothly engaging over the receiver and receiver ring of the rifle 10 to which the base 11 is secured.

The front section 15 is formed with a pair of longitudinally spaced apart bores 20 therethrough through which bolts as 21 may be engaged for engaging in the receiver of the rifle. The rear base section 16 is formed with an opening 22 therethrough and a bolt 24 secures the rear base section to the receiver.

The arm 17 is formed with a segmental arcuate lower surface conforming to the configuration of the concave surface 19 of the base. The upper side of the arm 19 is flat in continuation of the flat upper surface 18 of the base 11.

The bores 20 and 22 are formed with a counterbore as 25 opening through the upper flat surface of the base. The head of the bolts 21 and 24 are adapted to be enclosed within the counterbores in order that the bolts will not obstruct the upper surface of the base.

The front end of the base 11 is formed with a pair of forwardly extending clamping arms as 26 and 27. The arms 26 and 27 provide an adjustable clamp 28 at this end of the base within which the front ring 29 may be rotatably engaged. The arms 26 and 27 are formed with a peripheral opening 30 therethrough, and are spaced apart at their terminal ends.

A set screw as 31 engages through the arms 26 and 27 at the extreme end of the base and is adapted to extend across a segment of the opening 30 for purposes to be described hereinafter.

A front ring 29 is adapted to be clampingly engaged about the telescope 12. The ring 29 is formed of a flat annular ring 32 having spaced apart ends.

A substantially annular boss 34 is fixed to or formed on the split ends of the ring 32 being split medially whereby a segmental portion 35 is carried by one end of the ring and a corresponding segmental portion 36 is carried by the other end of the ring.

The boss 34 is formed with a peripheral groove 37 thereabout. A set screw 38 threadably engages through the boss portions 35 and 36 for adjusting the split ring 32 clampingly about the telescope 12.

A small portion of the boss 34 is flattened as at 39 whereby the flat portion of the boss may be aligned with the bolt 31 for pressing the boss 34 into the opening 30 of the base. Upon rotation of the ring 29 in the opening 30, the flat portion 39 will move out of engagement with the bolt 31 and the bolt will then engage within the peripheral groove 37. In this manner the ring 29 will be restrained against sliding movement out of the opening 30.

The ring 29 may be slidably engaged in the base 11 or removed therefrom by aligning the flat portion 39 with the transverse bolt 31 which cuts across a segment of the opening 30. The rear portion 16 of the base 11 is formed with a pair of notches or cutouts 40 on the opposite sides thereof. The notches 40 open through the upper and lower surface of the base 11 and are substantially annular for partially enclosing the round head 41 of bolts engageable in the base section 16.

The bolts 42 are provided with annular heads 41 having an inner concave surface as 44. Flanges 45 are thereby formed about the annular head 41 and the shank of the bolt 42 extends concentrically from the center of the head 41. The bolts on the opposite sides of the base portion 16 are oppositely threaded, that is, one of the bolts is threaded for left hand rotation and the other threaded for right hand rotation.

A rear ring as 46 is provided for the rear attachment of the telescope 12 to the base. The rear ring 46 is formed of a substantially flat split ring 47 split at the bottom thereof and formed with a substantially annular base or shank 48. The base 48 or boss is split intermediate the length thereof and one portion as 49 is carried by one end of the split ring 47 and the corresponding portion 50 is carried by the other end.

The split ring 47 is provided with a peripheral recess as 51 about the split ends thereof at the engagement of the ring with the boss 48. In this manner the boss 48 forms a flange which extends outwardly a short distance on opposite sides of the ring 47.

The flange 45 of the headed bolts 42 is adapted to engage within the recess 41 and over the flanged boss for securing the split ring 47 in place. The rings 46 and 29 are formed of a substantially wide ring to provide for a suitable bearing clamp about the telescope 12.

Suitable rubber inserts 51 may be contained within the rings 29 and 46 for providing a more secure clamping engagement. The inner rubber lining of the rings is extremely thin as .001 inch, but sufficient to make a perfect friction contact between the scope and mount, thus obviating the necessity of tightening the clamping screws to the point where the rings collapse the telescope sight tube. The rubber ring is preferably bonded or glued to the inner surface of the rings.

The longitudinal spaced apart relation of the rings provides for the secure mounting of the scope 12 on the base.

In the use and operation of this mount 11, the rings 29 and 46 are engaged about the telescope 12. One of the bolts 42 is removed from the base and the other bolt 42 remains in position for providing one fixed point with which the rear ring is engageable upon re-assembly. The telescope is disposed at right angles to the axis of the rifle for inserting the boss 34 in the opening 30.

The telescope 12 is then rotated 90° for alignment along the axis of the rifle and the one bolt 42 is threaded into place. Any windage adjustment required may be accomplished by the suitable adjustment of the bolts 42. For removing the telescope from the mount, it is necessary only to remove one of the bolts 42 and the scope may then be rotated 90° to remove the boss 34 from the opening 30. The subsequent installation of the telescope 12 will result in a seating substantially the same as the original seating.

I do not mean to confine myself to the exact details of construction herein disclosed, but claim all variations falling within the purview of the appended claim.

Having thus described my invention, what I claim is:

In a swiveling telescope sight mount comprising a base adapted to be secured upon the forward portion of a gun, and a front ring supported upon the base in a position to encircle the telescope and cooperate with another ring supported upon a rearward portion of the gun and encircling a rearward portion of said telescope, the features which include a pair of clamping arms having a circular opening therebetween, a clamping bolt extending through the clamping arms and across a segment of the circular opening therebetween, a depending boss upon the lower portion of the front ring, the latter being vertically split through the bottom thereof and through the depending boss, the latter having a peripheral groove intermediate the ends thereof for receiving the intermediate portion of said clamping bolt and allowing rotary adjustment of said front ring, a set screw in said groove interconnecting the two split portions of said depending boss within said circular opening, and a flat portion on said boss for clearing said bolt when inserting the boss into said opening.

MAYNARD P. BUEHLER.

REFERENCES CITED

The following references are of record in the file of this patent:

UNITED STATES PATENTS

| Number | Name | Date |
| --- | --- | --- |
| 1,816,195 | Redfield | July 28, 1931 |
| 2,043,430 | Doe | June 9, 1936 |
| 2,187,054 | Redfield | Jan. 16, 1940 |

FOREIGN PATENTS

| Number | Country | Date |
| --- | --- | --- |
| 266,848 | Great Britain | 1927 |